United States Patent [19]

Fukuhara et al.

[11] Patent Number: 5,014,334

[45] Date of Patent: May 7, 1991

[54] SIGNAL ENCODING AND DECODING SYSTEM

[75] Inventors: Takahiro Fukuhara; Tokumichi Murakami, both of Kanagawa, Japan

[73] Assignee: Mitsubishi Denki Kabushiki Kaisha, Tokyo, Japan

[21] Appl. No.: 521,578

[22] Filed: May 10, 1990

[30] Foreign Application Priority Data

May 11, 1989 [JP] Japan .................................. 1-117928

[51] Int. Cl.$^5$ .............................................. G06K 9/00
[52] U.S. Cl. ............................................ 382/86; 382/2
[58] Field of Search ..................... 382/2, 21, 56, 16; 358/426, 261.4

[56] References Cited

U.S. PATENT DOCUMENTS

4,107,648  8/1978  Frank ................................... 382/56
4,841,575  6/1984  Welsh et al. ........................ 382/16

Primary Examiner—David K. Moore
Assistant Examiner—Tan Dinh
Attorney, Agent, or Firm—Wolf, Greenfield & Sacks

[57] ABSTRACT

An encoding/decoding system is disclosed which comprises an analyzing encoder, a synthesizing decoder, two knowledge databases and two dynamic codebooks. The two databases are connected to the encoder and decoder respectively and store three-dimensional model data of feature images, shape and position information of elements of the feature images. The codebooks are connected to the encoder and decoder respectively and store luminance information of polygons such luminance information that the corresponding polygon seldom appears is eliminated. When a new polygon appears, the encoder encodes the luminance data of the polygon to transmit and gets the data in the codebook, and when any luminance data relative to a vector have been stored in the codebook, the encoder transmits the address of the vector.

5 Claims, 8 Drawing Sheets

| | D2 | D3 | D4 | D5 |
|---|---|---|---|---|
| D1 | POSITION INFORMATION OF FEATURE IMAGE | SHAPE INFORMATION OF FEATURE IMAGE | PIXEL-DATA INFORMATION OF FIRST FRAME | OUTLINE INFORMATION |
| D11 | THREE DIMENSIONAL MODEL DATA | | | |
| D12 | APEX RELATIVE COORDINATE DATA | | | |
| D13 | APEX CONNECTION DATA | | | |

| BRIGHTNESS VECTOR \ POLYGON NO. \ FREQUENCY OF APPEARANCE | 1 | 2 | | M | |
|---|---|---|---|---|---|
| 1 | Y(1,1) | Y(2,1) | | Y(M,1) | |
| 2 | Y(1,2) | Y(2,2) | | Y(M,2) | |
| | ~ | ~ | | ~ | ~ |
| N | Y(1,N) | Y(2,N) | | Y(M,N) | |

HIGH ←   → LOW

Fig. 9

SIGNAL ENCODING AND DECODING SYSTEM

BACKGROUND OF THE INVENTION

1. Field of the Invention

The present invention relates to an encoding/decoding system adapted to analyze and identify digital input image signals and encode the image signals, and transmit the analyzed and encoded signals to a receive side at which the encoded signals are decoded.

2. Description of the Prior Art

Figure 1:
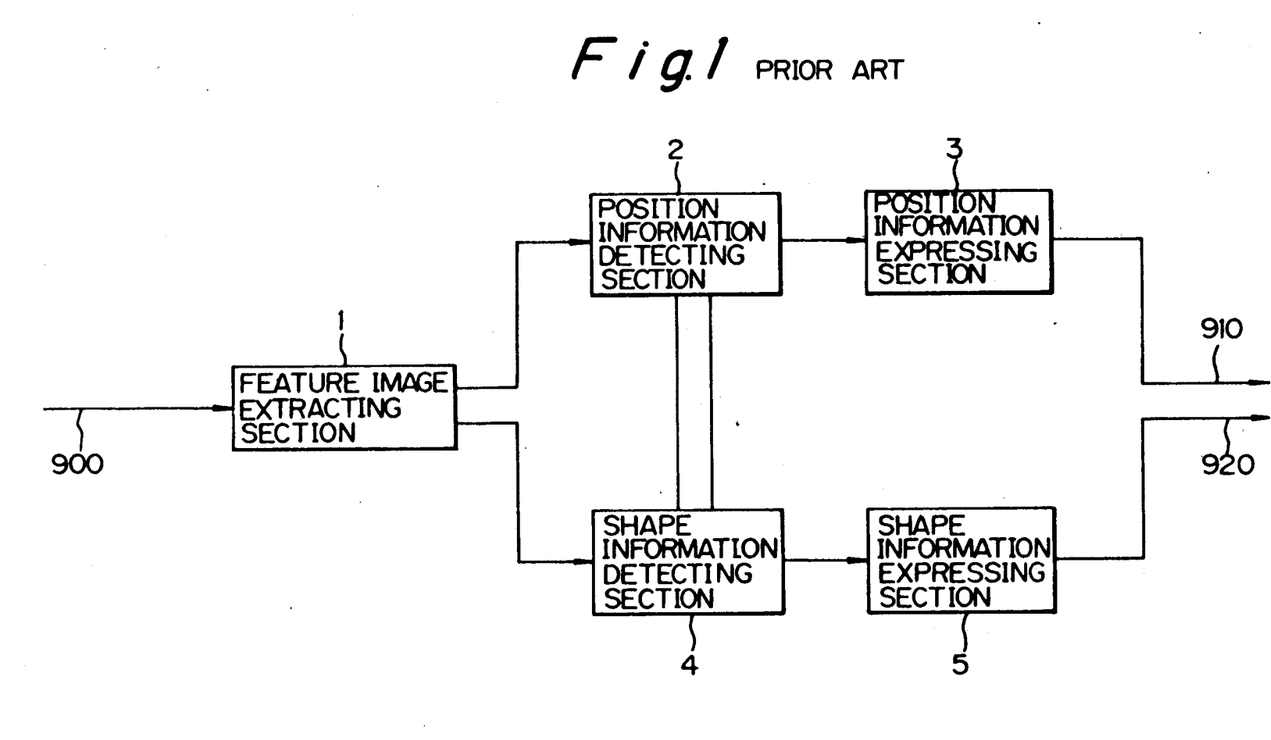
FIG. 1 is a block diagram illustrating an encoder according to a prior art.

FIG. 1 is a block diagram illustrating an encoder achieving an intellectual encoding means according to a prior art disclosed for example in Japanese Patent Public Disclosure (Kokai) No. 7787/89 Official Gazette. In the diagram, numeral 1 is a feature image extracting section adapted to extract signals of pixels corresponding to a predetermined feature part in an image from digital input image signals through a line 900 and to output feature signals, 2 a position information detecting section adapted to receive the feature signals from the section 1 and search positions of individual elements constituting the feature part, 3 a position information expressing section adapted to express in numerical values the signals from the detecting section 2 and to output element position signals to a line 910, 4 a shape information detecting section adapted to receive the feature signals from the section 1 and detect the shape of the elements of the feature part, and 5 a shape information expressing section adapted to express in numerical values the signals output from the detecting section 4 and to output element shape signals to a line 920.

These signals from the sections 3 and 5 are transmitted to a receiver side and decoded.

Figure 2A:
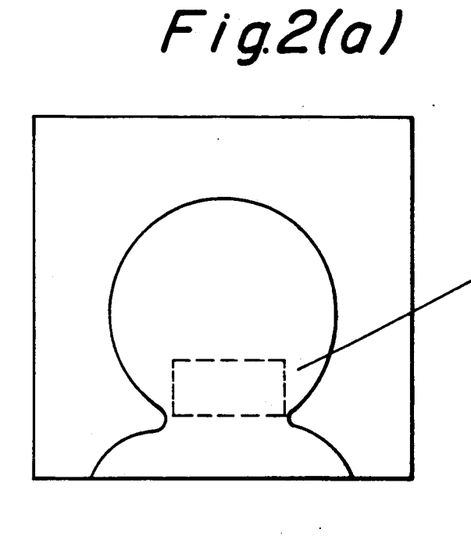
FIGS. 2(a) and 2(b) illustrate an input image and a feature image extracted by an encoder as shown in FIG. 1.
Figure 2B:
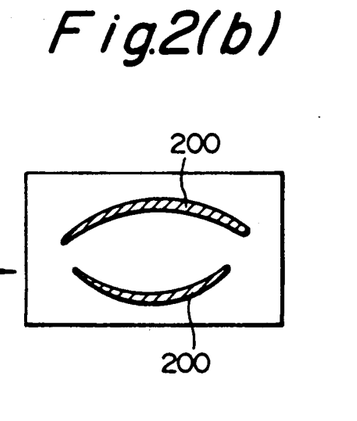

Operation of the encoder described above will be explained on the assumption that the image represented by the input image signals is a human face as shown in FIG. 2(a) and the predetermined feature part of the face image is a mouth portion as shown in FIG. 2(b).

The extracting section 1 functions to extract the mouth portion encircled by the dotted line in the face image shown in FIG. 2(a), and output mouth part signals as the feature signals to the position and shape information detecting sections 2 and 4. The position information detecting section 2 functions to search actual positions of the respective elements 200 shown in FIG. 2(b), or upper and lower lips on the whole image, and the position information expressing section 3 transforms the signals from the section 2 to signals expressed in the form of absolute coordinates based on the whole frame and outputs the element position signals to the line 910.

Figure 3:
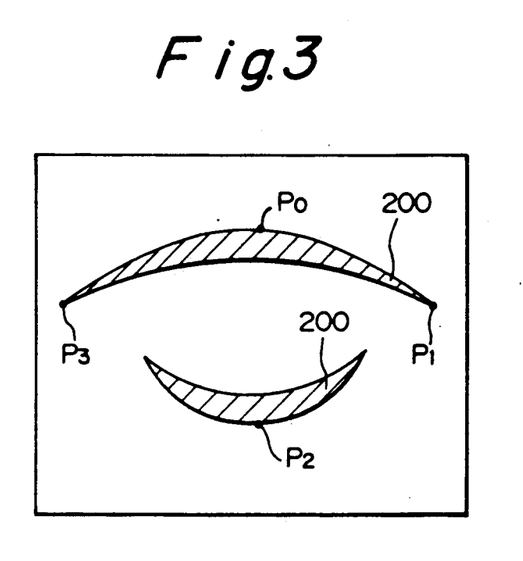
FIG. 3 illustrates a shape of a feature image detected by an encoder as shown in FIG. 1.
Figure 4A:
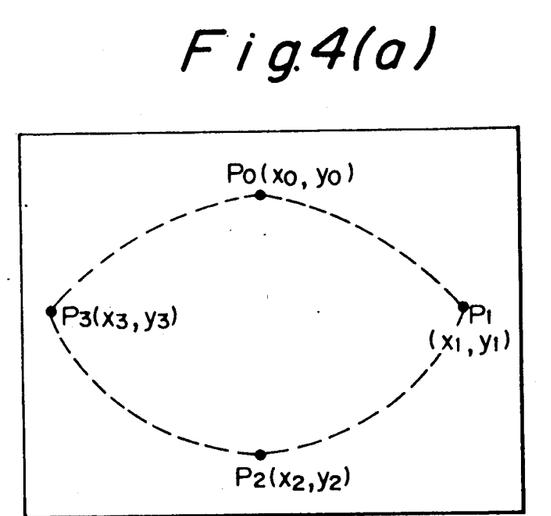
FIGS. 4(a) and 4(b) illustrate explanatory views for explaining numerical values output by an encoder as shown in FIG. 1.
Figure 4B:
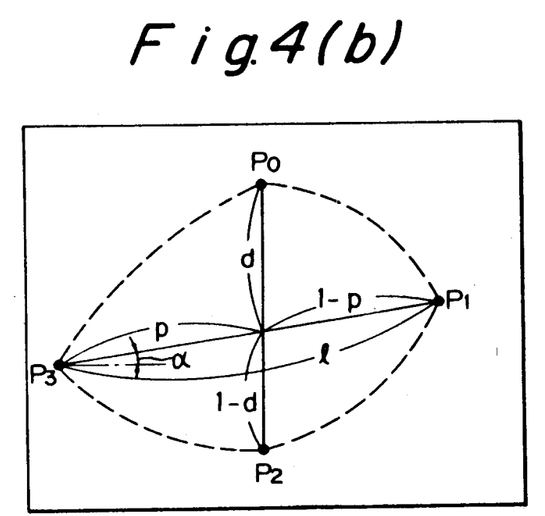

On the other hand, the shape information detecting section 4 functions to analyze the shape of the elements 200 and detect suitable feature points $P_0$, $P_1$, $P_2$ and $P_3$ which are end points and center points of the elements 200 as shown in FIG. 3. The shape information expressing section 5 operates to detect the coordinate values of the feature points, $P_0(X_0, Y_0)$, $P_1(X_1, Y_1)$, $P_2(X_2, Y_2)$ and $P_3(X_3, Y_3)$ as shown in FIG. 4(a) and the calculate and output parameters $\lambda$, p, d and $\alpha$ of the feature image shape as shown in FIG. 4(b), where $\lambda$ is a size between the points $P_1(X_1, Y_1)$ and $P_3(X_3, Y_3)$ for representing a mouth size, p and d are relative parameters to express the shape of the mouth image, and $\alpha$ is an inclination of the line $P_1P_3$ from the horizontal line.

According to the intellectual encoder constituted as described above, there has been such a problem that when a new shape not recorded in a memory incorporated in the sections 4 and 5 is found in the input image, it is impossible to detect such a shape or it is likely to be erroneously detected due to a lack of knowledge for detecting such a shape or a position thereof.

There has also been another problem wherein even if the shape and position of the input image do not change, but if luminance information of pixels (picture elements) constituting the feature image are considerably changed, the output image may be fairly different from the input image when pixel luminance information in a first frame is used for decoding at receiver side.

SUMMARY OF THE INVENTION

The present invention has been provided to solve the problems as mentioned above, and an object of the present invention is to provide a encoding/decoding system for image signals capable of detecting and expressing feature images effectively and at a low error rate even when a new shape appears in an input image or when luminance values of pixels in the feature image are largely changed.

The object of the present invention as described above is attained by an encoding/decoding system which includes a knowledge database and a dynamic codebook interconnected respectively to both an analyzing encoder and a synthesizing decoder. The knowledge database has, as knowledge, three-dimensional model information of images, shape information and position information on the features of respective elements of an input image, and the dynamic codebook has a learning function obtained by storing luminance values of pixels in a triangle (called hereinafter as polygon) which is an element of the three-dimensional model, a number of the polygon and by cancelling those polygons that appear less frequently.

DESCRIPTION OF THE PREFERRED EMBODIMENTS

Figure 5:
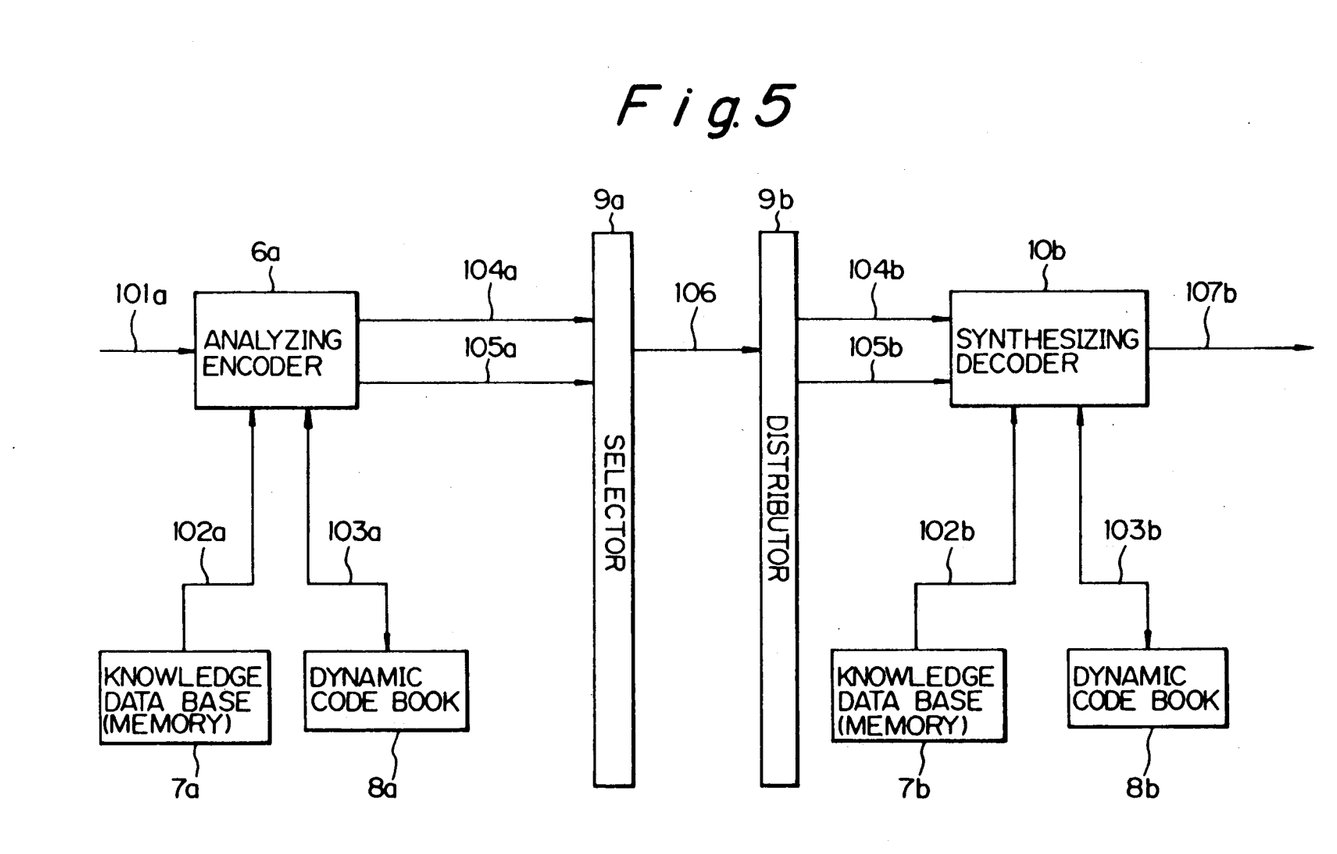
FIG. 5 is a block diagram illustrating an encoding/decoding system according to the present invention.

FIG. 5 illustrates an embodied diagram of the present invention.

In the diagram, numeral 6a is an analyzing encoder for inputting image signals and outputting parameter signals of a three-dimensional model as a feature image and PCM-encoded image signals, or luminance signals of the three-dimensional model to lines 104a and 104b respectively, 7a a knowledge database including a ROM storing knowledge data, 8a a dynamic codebook comprising a DRAM for writing in and reading out data, 9a a selector adapted to switch the parameter signals and encoded image signals output from the analyzing encoder 6a of the transmission side, 9b a distributor adapted to distribute the data from the transmission side to lines 104b and 105b, synchronously with the operation of the selector 9a, and 10b a synthesizing decoder adapted to synthesize the received parameter signals and the received encoded image signals and decode the parameter signals on the basis of support by a knowledge database 7b and a dynamic codebook 8b which have the same respective constitutions as the database 7a and codebook 8a.

Figure 6:
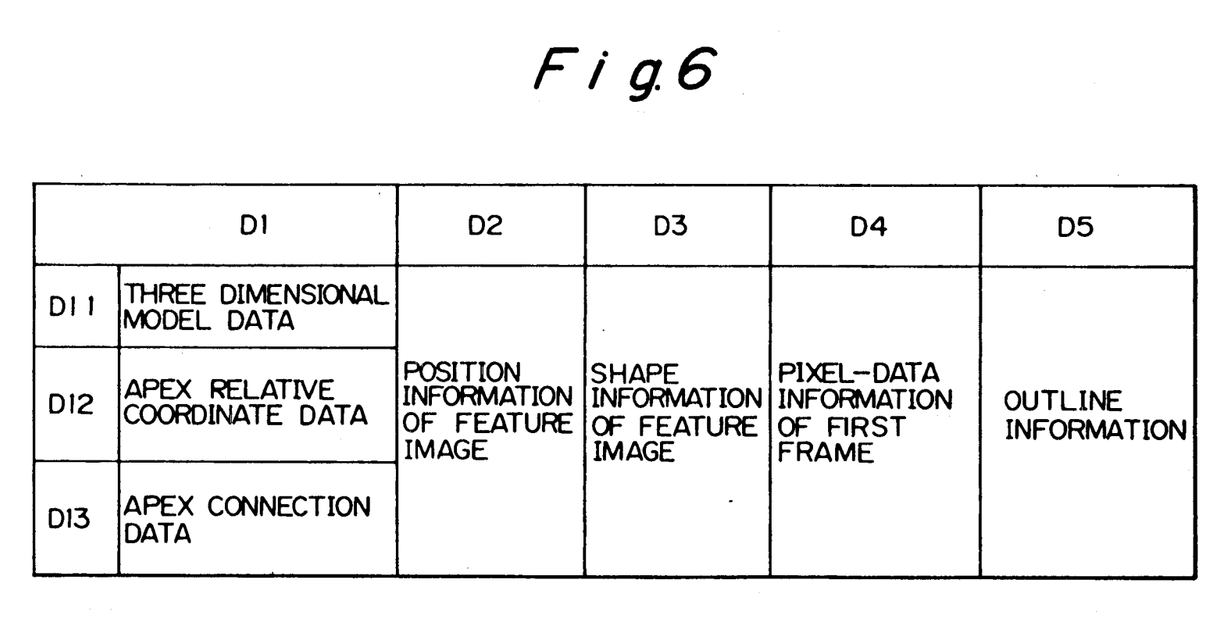
FIG. 6 illustrates contents stored in a knowledge database included in the encoding/decoding system shown in FIG. 5.

FIG. 6 illustrates the storage content of the knowledge databases 7a and 7b. In the storage content, the apex relative coordinate data stored in a region D12 shows relative position information of respective polygons forming the three-dimensional model and the apex connection data stored in a region D13 shows connecting relationships between the respective polygons. Formats of the position information stored in a region D2 and the shape information stored in a region D3 of the feature image may be same as those of a prior art as described above. These position information and shape information are changed in accordance with the input image signals by rewriting operation of the encoder 6a. The first frame pixel-data information stored in a region D4 is the luminance and color information obtained from the first frame image. The contour information stored in a region D5 is obtained from the three-dimensional model information stored in a region D11 and it will be correspondingly varied when the three-dimensional information is varied.

Figure 7:
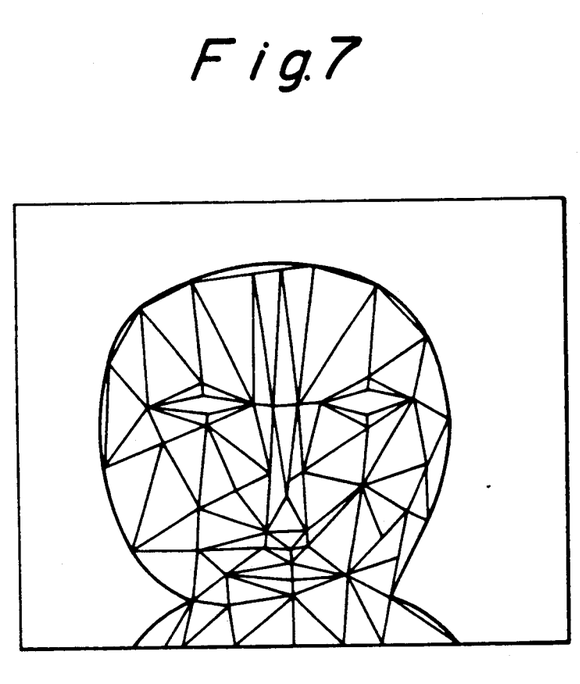
FIG. 7 illustrates a polygon expression of a three-dimensional model as an input image.

When the analyzing encoder 6a receives image signals which may represent such a three-dimensional model as a human body above the shoulder having a number of polygons as shown in FIG. 7, the encoder 6a detects a rotary angle information, a contour information of the three-dimensional model and position information of respective elements of the model. These elements may be eyes, ears, a nose or a mouth. The encoder 6a then expresses them in the form of indexes, or addresses in the knowledge database 7a by referring to the content of the base 7a. The index signals are provided as the parameter signals to the line 104a.

Figure 8:
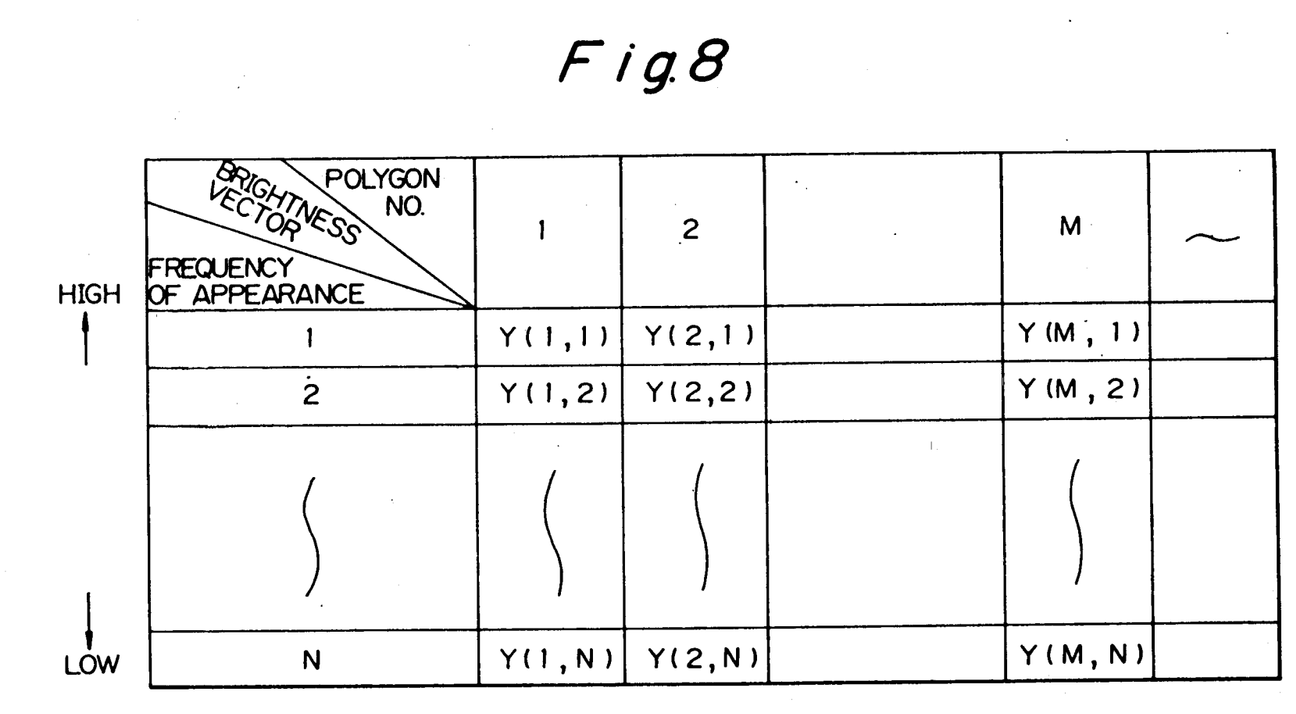
FIG. 8 illustrates contents to be stored in a dynamic codebook included in the encoding/decoding system shown in FIG. 5.

FIG. 8 shows data to be stored in the dynamic codebooks 8a and 8b, which will now be explained in accordance with the actual processing steps.

In the initial condition, the codebook is empty.

When the image information of the first frame is input to the encoder 6a, luminance information vectors Y(1,1) through Y(M,1) of the respective polygons thereof are detected in accordance with the image, or luminance information of the first frame; wherein M is the number of polygons, $$Y(Z,1) = \{y_{11}, y_{21}, \ldots, y_{p1}\},$$

Z is a polygon number from 1 through M, p is the total number of pixels in the polygon Z.

These luminance information vectors are then stored in the codebook 8a as shown in FIG. 8. At this state, the other areas of the codebook 8a keep its empty.

At the same time, these luminance information vectors are encoded in PCM and then transmitted through the line 105a, selector 9a, line 106, distributor 9b and line 105b to the decoder 10b. The received vectors are decoded and stored in the codebook 8b in the similar way.

Next, when the image information of the second frame is input to the encoder 6a, the luminance information vectors Y(1,2) through Y(M,2) are gotten and stored in the codebook 8a in the similar way. If these vectors are almost similar to any the vector among Y(1,1) through Y(M,1), address information of the vector is transmitted to the receiver side. At the receiver side, the corresponding vector stored in the codebook at the first frame transmission is put out. However, if a new shape not contained in the three-dimensional model data in the knowledge database 7a appears in an input image, a luminance information vector (M+1,1) corresponding to a new polygon, or a M+1th polygon of the new shape will be stored in the codebook 8a as shown in FIG. 8.

In this way, every time a new shape appears, a new luminance information vector is stored in the codebook 8a. Accordingly, if an identical shape, for example the polygon (M+1) appears again in the input image information, the luminance information vector Y(M+1,1) just stored is detected and the address information "Y(M+1,1)" of the vector Y(M+1,1) will be transmitted as a parameter signal to the line 104a, where transmission at an ultra low bit rate can be achieved.

On the other hand, if any polygon, which luminance information vectors have been stored in the codebook 8a, does not appear frequently, the encoder 6a will detect those polygons and command the cancellation of the corresponding vectors from the codebook 8a.

In this way, acquisition of knowledge by the codebook 8a is accomplished.

The analyzing encoder 6a also calculates a distortion value $d_S$ between the luminance information vector X(Z) of a Zth polygon including p pixels in the current input frame and the luminance information vectors Y(Z,S) of the Zth polygon stored in the codebook 8a as follows:

$$d_S = ||X(Z) - Y(Z,S)||^2$$
$$= \sum_{i=1}^{P} (x_i - y_{iS})^2$$

wherein $X(Z) = \{x_1, x_2, \ldots, x_p\}$
$Y(Z,S) = \{y_{1S}, y_{2S}, \ldots, y_{pS}\}$
$(1 \leq S \leq N)$ This value $d_S$ is obtained for every polygon and for every frame, and an optimum vector $Y(Z,S_0)$ with the value $d_{S0}$ being minimum will be decided.

Subsequently, the minimum distortion value $d_{S0}$ and a predetermined threshold value T will be compared, and the following processing will be executed:

(I) When $d_{S0} < T$:

As to the polygon having this relationship, the address of the vector Y(Z,S₀) in the codebook 8a will be transmitted as parameter signals to the line 104a.

(II) When $d_{S0} < T$:

The luminance information vector X(Z) of the polygon Z in the current frame is encoded in PCM and transmitted as the image signals to the line 105a.

These obtained parameter signals and PCM-encoded image signals are automatically switched by the selector 9a and transmitted to the receiver side. The received information is divided into the parameter signals and PCM-encoded image signals again by the distributor 9b and these signals are input to the synthesizing decoder 10b.

The decoder 10b decodes signals by referring to the knowledge database 7b and the dynamic codebook 8b in case the received signals are the parameter signals, and complementally decode them in case they are the PCM-encoded image signals.

Figure 9:
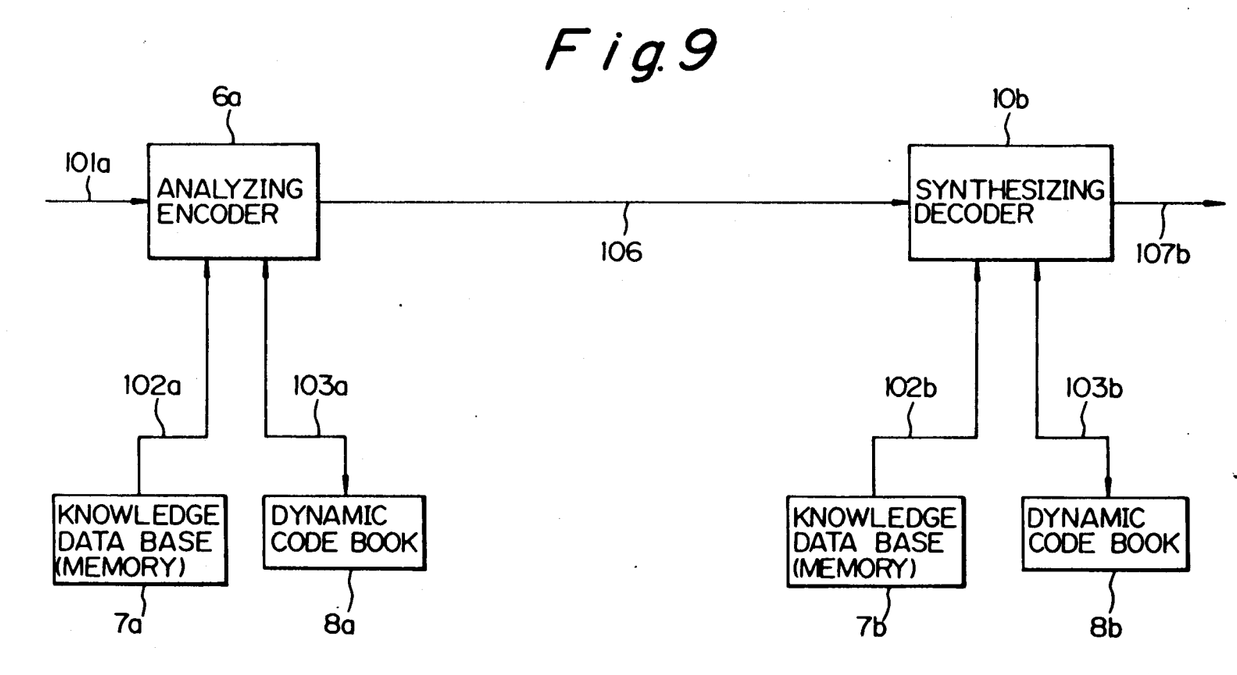
FIG. 9 is a block diagram illustrating another embodiment of the present invention.

According to the embodied diagram as described above, the selector 9a and the distributor 9b are incorporated. However, it is also possible to multiplex both the signals at the encoder 6a and to transmit such multiplexed signals directly to the decoder 10b in the receiver side as shown in FIG. 9, so that the selector 9a and distributor 9b may be eliminated.

Obviously many modifications and variations of the present invention are possible.

What is claimed is:

1. An encoding/decoding system comprising:
    an analyzing encoder for inputting image signals, outputting encoded image information signals or parameter information signals;
    a synthesizing decoder for inputting the encoded image information signals and parameter information signals and outputting decoded image signals;
    first and second knowledge databases connected to the encoder and decoder respectively, each of the databases having knowledge, three-dimensional model data of a feature image represented by input image signals, shape and position information of feature image elements; and
    first and second dynamic codebooks connected to the encoder and decoder respectively, each of the codebooks for storing luminance information vectors of the polygons constituting three-dimensional model and cancelling such a luminance information vector stored that the corresponding polygon seldom appears afterwards.

2. An encoding/decoding system according to claim 1, wherein when a new polygon, any luminance vector of which is not stored in the current codebook, is found in the current input image frame, the encoder encodes in PCM the luminance vector of the polygon and outputs it as an encoded image information signal, and manages to store the luminance vector in the codebook, while when any luminance vector in the current frame have been stored in the corresponding region of the codebook, encoder outputs an address as a parameter signal and manages to store the luminance vector in the region.

3. An encoding/decoding system according to claim 2, wherein the encoder returns as the parameter signal, the address of a luminance vector stored in the codebook such that the difference between the luminance vector stored at that address in the codebook and the vector of the polygon in the current frame is the smallest such difference obtainable between the vector of the polygon in the current frame and each of those stored in the code book.

4. An encoding/decoding system according to claim 3, wherein when the smallest difference is larger than a predetermined level, the encoder outputs the PCM encoded luminance vector of the polygon in the current frame instead of an address.

5. An encoding/decoding system according to claim 1, wherein the system further comprises a selector connected to the encoder for switching the parameter information signals and encoded image information signals to be transmitted and a distributor connected to the decoder for distributing the received signals to the parameter information signals and encoded image information signals.

* * * * *